United States Patent [19]

Lew

[11] Patent Number: 4,528,648
[45] Date of Patent: Jul. 9, 1985

[54] MEMORY MANAGEMENT SYSTEM

[75] Inventor: Eugene K. Lew, Sunnyvale, Calif.
[73] Assignee: Sperry Corporation, New York, N.Y.
[21] Appl. No.: 400,335
[22] Filed: Jul. 21, 1982
[51] Int. Cl.³ .......................... G11C 8/00; G11C 9/06
[52] U.S. Cl. .................................. 365/236; 365/230; 364/200; 364/900
[58] Field of Search .............. 365/236, 233, 238, 239, 365/230; 364/200 MS File, 900 MS File

[56] References Cited

U.S. PATENT DOCUMENTS

| | | | |
|---|---|---|---|
| 3,911,404 | 10/1975 | Oneill, Jr. | 364/900 |
| 3,990,054 | 11/1976 | Perlowski | 364/900 |
| 4,042,972 | 8/1977 | Gruner et al. | 364/900 |
| 4,129,901 | 12/1978 | Masuda | 364/900 |
| 4,393,482 | 7/1983 | Yamada | 365/236 |
| 4,394,753 | 7/1983 | Penzel | 365/236 |

OTHER PUBLICATIONS

Waldecker, "Memory Error Correction", IBM Technical Disclosure Bulletin, vol. 13, No. 1, Jun. 1970, pp. 52-53.

Primary Examiner—Stuart N. Hecker
Assistant Examiner—Glenn A. Gossage
Attorney, Agent, or Firm—John B. Sowell; Thomas J. Scott; Marshall M. Truex

[57] ABSTRACT

A unique memory management system for use with a memory device which is common (or shared) with a plurality of user elements utilizing a memory address counter, scratch pad address memory, external memory address inputs and an address multiplexer.

5 Claims, 1 Drawing Figure

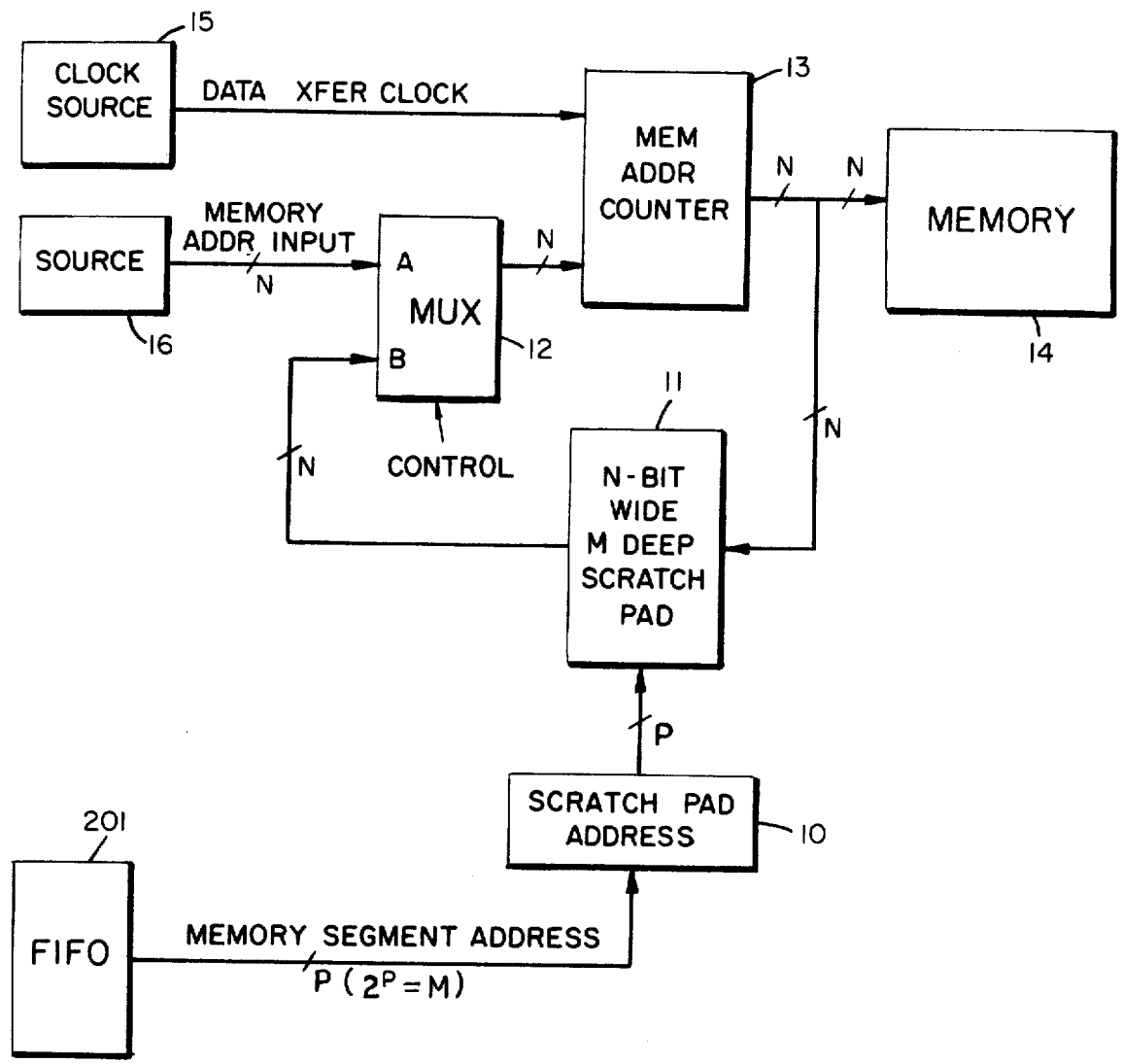

MEMORY MANAGEMENT SYSTEM

BACKGROUND

1. Field of the Invention

This invention is directed to a memory system, in general, and to a common or shared memory with a unique addressing system, in particular.

2. Prior Art

There are many known memory systems available in the art today, especially in the electronic data processing or information handling systems. The memories can take many forms. Memories can be semi-conductor devices or any number of other technologies.

The number of electronic systems which use memories is also large. The methods wherein the systems utilize or address the memories is substantial. One type of system architecture is described in the copending application of Harvey Wallace and Eugene Lew, titled HIGH SPEED BUS ARCHITECTURE, filed on July 21, 1982, and bearing U.S. Ser. No. 400,493 (now U.S. Pat. No. 4,494,192 issued Jan. 15, 1985) assigned to the common assignee and incorporated herein in its entirety by reference. This prior art system includes a memory which is, effectively, segmented to supply (or store) information from a plurality of users. Thus, a segment is provided in the memory for each of the users and is identified therewith. The memory will interact with one or more users under control of the system as described in the aforesaid patent application of Wallace, et al.

SUMMARY OF THE INSTANT INVENTION

The instant invention is directed to a memory system wherein the memory includes a plurality of segments, each of which can be used independently or concurrently by an appropriate number of user pairs. Each segment has its address stored in a scratch pad memory. The memory segment address is supplied by the scratch pad memory to determine which segment address is to be used. The scratch pad memory is addressed by a device controlled by the users. The memory is selectively addressed either by the scratch pad memory or by an external memory address input to address the memory. A memory address counter/register receives the memory address input and supplies same to the memory. A data transfer clock signal is used for memory address incrementing and operation synchronization thereof.

BRIEF DESCRIPTION OF THE DRAWINGS

The sole FIGURE is a block diagram of the circuit of the instant invention.

DESCRIPTION OF A PREFERRED EMBODIMENT

Referring to the sole FIGURE, there is shown the memory system of the instant invention. In this system, a storage memory 14 of any suitable application is provided. The storage memory may be of any appropriate size (i.e., capacity) for the particular application. The memory 14 is connected via an address bus to the output of memory address counter 13 and to an input of scratch pad memory 11. The output of scratch pad memory 11 is connected to one input (B) of multiplexer 12. The other input (A) of multiplexer 12 is supplied by a suitable memory address source 16. The output of MUX 12 is connected to an input of memory address counter 13. The clock input of counter 13 is connected to the data transfer clock source 15.

Another input of scratch pad memory 11 is connected to the output of scratch pad address buffer 10 which has the input thereof connected to a memory segment address source 201. In one application, the address source 201 can be a first-in, first-out (FIFO) circuit. In point of fact, the FIFO 201 can be the same as the FIFO 201 in the copending application of Wallace, et al., noted above.

In operation, it is assumed that the storage memory 14 is divided into a plurality of segments. The number of segments is not critical to the invention but is a function of the device utilization. When the circuit is used with a system such as described in the copending Wallace, et al., patent application, the storage memory 14 includes 16 separate segments. These segments can be equal in storage capacity, or not, as may be required or desired. Moreover, some or all of the segments can be linked together by means of microprograms or the like to form a larger memory size per segment.

It is assumed that each of the segments in memory 14 is identified by a memory segment address. Therefore, when the memory segment address is applied to the system, the appropriate memory address and the contents thereof can be selected.

In the illustrative example, the memory includes sixteen segments. Consequently, scratch pad memory 11 will have a configuration of N-bits wide and sixteen addresses (words) deep. The number "N" is determined by the number of bits required to select an address in storage memory 14. The sixteen addresses are associated with the sixteen memory segments. For this example, four bits (lines) ($2^4=16$) are needed to access sixteen deep scratch pad memory, although in other configurations a different number may be used.

It is assumed that at start up of the operation, the appropriate information is stored in storage memory 14. Likewise, the appropriate memory segment addresses are stored in scratch pad memory 11 through microprogramming or other appropriate start up sequence. With the application of a memory segment address signal from FIFO 201 to the scratch pad address buffer 10, the 4-bit address of scratch pad memory 11 is stored in buffer 10. Thus, FIFO 201 can be ready to receive other information, if appropriate. The scratch pad address buffer 10 applies its outputs to the address input of scratch pad memory 11. This selects the appropriate memory address in scratch pad memory 11. The content of the addressed location in scratch pad 11 is then applied to the B input terminal of MUX 12. It should be noted that the contents of the scratch pad memory 11 which is selected is an address signal for storage memory 14. The address signal is transferred through MUX 12 and applied to memory address counter 13. This signal is then supplied to both storage memory 14 to activate the address identified by the signal and, as well, is returned to scratch pad memory 11. At the end of segment operation, the main memory address is stored back in the respective segment location in scratch pad memory 11.

After the contents of the specified address have been selected and acted upon relative to storage memory 14, the data transfer clock signal supplied by source 15 is supplied to memory address counter 13. The first clock is operative to transfer the memory address from MUX 12 to memory address counter 13. The second and subsequent clock pulses operate so that the counter is incremented (or decremented) after each word of information is transferred from storage memory 14. This permits the various addresses in each memory segment to be accessed and used. In the event that a special memory address in any memory segment is desired, a special signal is supplied by memory address source 16 to MUX 12. At the same time, a control signal supplied by control source 17 activates MUX 12 so that the A input signals are supplied therethrough and the B input signals are blocked. The signals from memory address source 16 are then transferred through memory address counter 13 to storage memory 14 such that the particular segment and address location are selected. The contents of this selected memory location are then transferred out and the operation continues as described above. In the case where an address input signal from source 16 is not used, the address signals from scratch pad memory 11 at the B input terminals of MUX 12 may be utilized. However, the advantage of the circuit is that the particular memory address from counter 13 which had previously been involved in the operation in accordance with the selection from FIFO 201 is stored in that same location in scratch pad memory 11. Thus, when the memory segment address from FIFO 201 is reactivated, the same location of scratch pad memory 11 is selected. However, the particular address (the content of the segment location) which was under consideration is stored in scratch pad 11 and, then, recirculated through the system as described. Consequently, an interrupted operation is picked up and continued from the last operable location.

For example, assume that a segment of memory included one thousand addresses from 1000 to 1999. The appropriate memory segment address would be supplied to select this segment. The segment address would be supplied from FIFO 201 to scratch pad 11 through scratch pad address buffer 10. The contents (i.e., 1000 in this case) would be supplied to memory address counter 13 through MUX 12. As the system operates, the data transfer clocks would store the main memory address from scratch pad 11 in memory address counter 13. The next clock increments the address counter 13 thereby stepping memory 14 through the memory addresses of the specific segment, for example, 1000, 1001, 1002 . . . and so forth. In the event that the operation is interrupted at address 1499, this address would have been produced by counter 13 and applied to storage memory 14 to activate that address in the memory. This address would also have been returned to scratch pad 11 and stored therein at that location identified by the appropriate memory segment address from scratch pad address buffer 10. When the operation resumed, the memory segment address would be applied to scratch pad 11 from FIFO 201 through scratch pad address buffer 10 and would select the appropriate memory portion therein and the contents thereof would then be 1499 which would be applied to the circuit. This would then permit the circuit to pick up exactly where it was before and to continue its operation without any initial or overhead set up time.

In the case where a main memory address 1200 is used instead of 1499 (equivalent to a "jump" instruction), the address 1200 may be set on port A of MUX 12, the address 1200 will be stored in memory address counter 13 to resume the operation.

Thus, there is shown and described a unique addressing control system for a common or shared memory. The addressing control system permits improved and advantageous operation of a common memory system. The description suggests certain numbers of segments, addresses, address bit sizes and so forth. It is to be understood that these are illustrative data only and are not intended to be limitative. Any other suitable numbers of addresses, segments and bits which fall within the purview of this description, are intended to be included therein as well. The scope of the invention is limited only by the claims appended hereto.

Having thus described a preferred embodiment of the invention, what is claimed is:

1. A shared memory system comprising,
   storage memory means (14),
   scratch pad memory means (11),
   memory address means (13) connected to supply an address signal to said storage memory means to access the contents thereof and to concurrently supply said address signal to said scratch pad memory means thereby to store said address signal therein,
   multiplexer means (12) connected to supply signals to said memory address means thereby to provide said address signal,
   said scratch pad memory means connected to supply address signals to said multiplexer means which are selectively supplied to said memory address means,
   source means (16) connected to said multiplexer means to selectively supply address signals to said memory address means via said multiplexer means, and
   address register means (10) connected to the input of said scratch pad memory means to supply further address signals thereto.

2. The system recited in claim 1 including,
   control means for supplying control signals to said multiplexer means to control the signals which are to be supplied to said memory address means.

3. The system recited in claim 1 wherein,
   said memory address means comprises counter means for providing sequential memory address signals to said storage memory means and to said scratch pad memory means.

4. The memory system recited in claim 3 including,
   clock source means connected to said memory address means to supply synchronizing signals thereto.

5. The system recited in claim 4 wherein,
   said memory address means includes counter means which is incremented or decremented by the application of said synchronizing signals.

* * * * *